Figure 1:
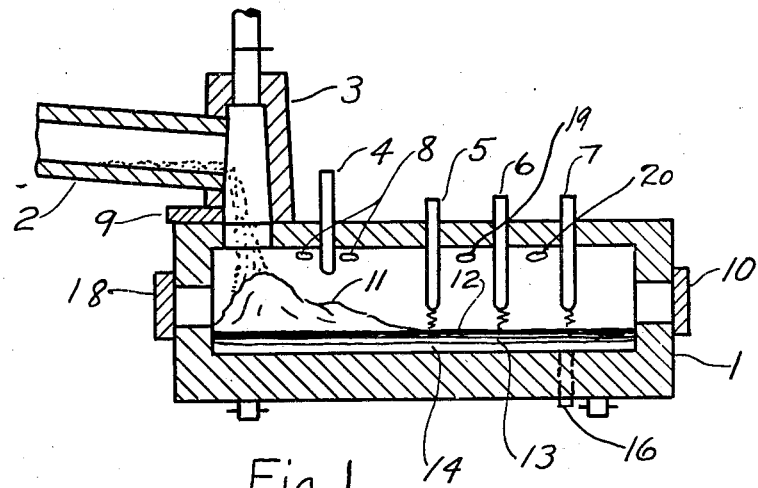

Aug. 1, 1933.  A. E. GREENE  1,920,376

ELECTROTHERMIC REDUCTION PROCESS

Filed Dec. 18, 1930

Patented Aug. 1, 1933

1,920,376

UNITED STATES PATENT OFFICE

1,920,376

ELECTROTHERMIC REDUCTION PROCESS

Albert E. Greene, Medina, Wash.

Application December 18, 1930. Serial No. 503,235

14 Claims. (Cl. 75—22.5)

My present invention relates to the reduction of oxides and oxide ores to produce metal therefrom and to the production of refined metal or alloy metal and particularly low carbon metal or alloy metal. My process of this invention relates particularly to the treatment of iron ore or ores containing iron and other oxides such as chromium or manganese, and to the treatment of ores containing one or more such metals to produce a refined metal or alloy therefrom.

My present application is a continuation in part of my copending applications for patent, Serial No. 726,541 filed July 17, 1924, Serial No. 34,041 filed June 1, 1925, and Serial No. 121,137 filed July 8, 1926.

In direct ore reduction processes the aim has been to produce metal directly and continuously from the ore. The processes of my copending applications just mentioned are such. I have discovered a simple method of producing relatively low carbon metal directly from the ore, and also a method of operation whereby very low carbon metal can be produced in a simple manner.

My present invention contemplates the preparation and treatment of a mixture of ore, carbonaceous material and flux, whereby the simple reducing action of carbonaceous material may be taken advantage of to produce a relatively low carbon metal, or alloy.

More specifically, in one modification of my invention, my process contemplates reducing an oxide by means of carbon under controlled temperature and slag conditions which prevent carbonization of the reduced metal.

In certain instances, my invention contemplates the reduction of the metal from the oxide and the collection of the reduced metal beneath a molten slag, which separates the carbon-containing charge from the reduced metal, permitting the reduced metal to solidify beneath the slag until sufficient metal has collected there and then finishing this reduced metal and pouring it into molds, or into another furnace.

In one application my invention contemplates the direct reduction of an oxide ore such as manganese ore in a basic lined furnace with an excess of carbonaceous material in the original charge but without producing a high carbon product, and in this process the oxide of manganese is partly reduced and the reduced metal collects beneath a slag containing oxide of manganese and other slag making ingredients which serve to prevent carburization of the reduced metal.

In one modification of the process of my present invention I may treat an oxide of a metal to reduce it by means of carbonaceous reducing material in the presence of suitable acid and basic fluxing agents and produce an intermediate carbon content metal, and during the treatment in the reducing and melting chamber subject the charge and products to increasing temperatures whereby the slag in the final stage of treatment is subjected to more intense reducing conditions so as to reduce more metal from the oxides held in the slag. Then in another modification of this process I may operate to partly reduce the metal and to maintain a slag containing a portion of oxide of said metal in order to produce a lower carbon product.

One feature of my invention relates to the preparation and mixing of the charge materials whereby reduction is facilitated by intimate mixing of the particles. Another feature relates to the provision of the proper fluxing materials so that a fluid slag is produced on which carbon may be applied without carbonizing the reduced metal beneath, and utilizing such a slag to make possible and facilitate the reduction of the desired metal oxide therefrom.

Another feature of my process of this invention is the limitation of the amount of carbonaceous reducing material in the charge whereby, under the conditions maintained in the reducing and melting chamber, a certain portion of unreduced oxide remains to assist in producing a low carbon metal and to prevent contamination of the metal by contact with solid carbon.

Another feature of my invention relates to the temperature control during the movement of the charge through the steps of the process, and still another feature relates to the control of the slag composition and to the nature of the hearth lining for satisfactory operation of the process with certain slags. Thus, in the reduction of manganese ore I prefer to use a basic hearth and likewise in the treatment of the charge to produce low carbon iron or low carbon chromium-iron alloy metal, where a certain amount of oxide is maintained in the slag to aid in producing low carbon metal.

Another feature of my process is the combination of a continuous reduction process with a batch process when a given amount of metal has been reduced and collected beneath the slag and is to be finished by cutting off the feed and reducing steps, and treating or melting the reduced metal under a finishing slag.

Figure 2:
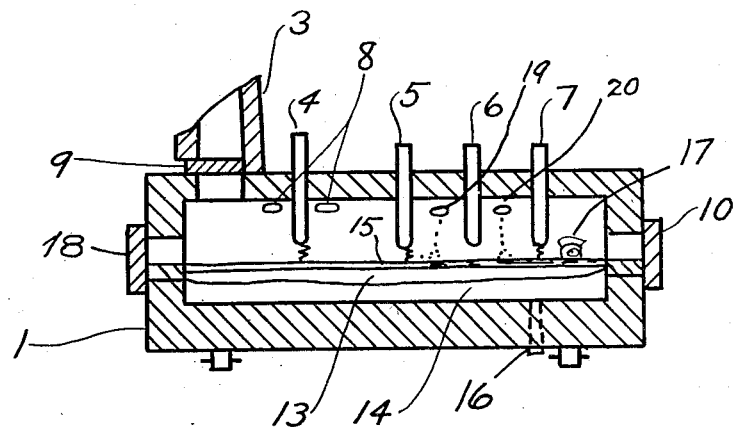

In the annexed drawing I have shown apparatus in which my process of this invention may be practiced and illustrated certain steps of the process. In this drawing, Fig. 1 is a diagrammatic sectional elevation of a furnace in which my process is illustrated, more particularly the continuous operation steps. Fig. 2 shows a sectional view of the same furnace as in Fig. 1 but in a different stage of operation.

These and other features of my process will be further described more fully.

My invention is based on certain discoveries which I have made. Among these is the fact that I can prepare an intimate mixture of an oxide or ore and carbonaceous material, such as coal, and flux such as will provide a fluid slag with the ingredients of the charge, and that by feeding this charge into a reducing and melting chamber on a bath therein, and heating this charge, I can reduce the metal and produce a relatively low carbon metal even though I charge an apparent excess of carbon which would more than reduce the oxide and carbonize the metal. I have discovered that I can maintain a slag which contains some unreduced metal oxide and thus form a barrier against undue absorption of carbon in the metal. I have discovered that I can take advantage of the relatively high melting point of certain metals and alloys when they are low in carbon content, so as to permit collecting the reduced low carbon metal in solidified condition while maintaining molten slag above it, and then subsequently finishing this low carbon metal to melt it under reducing conditions and then pour it.

With respect to the reduction of manganese ore, I have discovered that I can carry out a continuous reduction of the manganese ore by preparing a charge containing the intimately mixed ore, and carbon in some convenient form such as coal or retort carbon, and also lime to form slag with silica present, and that with an apparent excess of carbon in this charge I can feed it into a basic lined electrically heated furnace on top of the molten slag bath therein and cause reduction of the manganese oxide which collects beneath the slag with a relatively low carbon content. And I have discovered that I can carry out this process continuously without tendency to fuse the charge and thereby stop the movement of the charge after it is fed on the top of the bath. Also I am able to subject the slag thus produced to reducing action by means of carbon on top of the molten slag without carbonizing the reduced metal beneath. I have discovered that I may prepare a bath of low carbon iron under a slag and carry out the reduction of manganese into this bath to produce low carbon manganese iron alloys, and that I can reduce the oxides of two or more metals together into a low carbon metal.

I have discovered that an oxide such as manganese oxide or iron oxide or chromium oxide can be reduced at relatively low temperatures compared to those temperatures ordinarily attained in front of the tuyères of a blast furnace or in close proximity to the arc, and that reduction of the oxide which is in close contact with the carbon of the charge takes place before the charge fuses, and that thereafter the unreduced oxides of the ore fuse with the flux, such as lime, and form fluid slag on top of the reduced metal and prevents access of carbon thereto. I can carry out this process in a continuous manner and in doing so I feed the ore and carbon and flux mixture into the reducing and melting chamber on top of the bath therein and maintain the temperature so that reduction proceeds. The temperature which I maintain in the charge after it enters this chamber appears considerably more than that which can be maintained in a rotary kiln without causing sintering. The temperature in the pile in my process, however, is apparently lower than the temperature in the slag formed from the unreduced materials of the charge. This slag can be maintained at the desired temperature by means of arcs.

Heretofore there has been no process which works or worked satisfactorily on fine ore charge. My process appears to work better on such a charge. Heretofore it has not been possible to reduce the oxides prior to fusion of the slag and to produce a low carbon or intermediate carbon metal, and yet my process does that very simply and with reduced energy consumption over any process which I have tried or am aware of.

I have discovered that I can reduce the oxide of one metal or of two or more metals together and thus produce an alloy metal.

I have discovered that I can produce a very pure iron at the sacrifice of some oxide which is left unreduced and that this process can be carried out at temperatures even in the molten slag after the charge is largely reduced, which temperatures are relatively low as compared with the melting point of the reduced iron; and I have found that this process is applicable where the metal reduced has a relatively high melting point in the low carbon condition whereby the reduced metal solidifies in relatively pure condition.

My invention may be applied to produce a relatively low carbon ferro manganese as follows:— A basic hearth electric arc furnace is provided, such as a three electrode, three phase Greene arc furnace, preferably having a range of voltage between 100 and 175 or 200 volts between electrodes. A small charge of ferromanganese may be first melted in this and covered with a slag composed of lime with some silica and preferably some 10 to 20 percent of manganese oxide. The ferromanganese may be of whatever approximate composition is desired to be made. The slag may contain about 25% of silica and enough lime to form a basic slag which will not be difficult to reduce.

The ore charge may be prepared as follows:— The manganese ore may contain, for example, 55% metallic manganese as oxide and 10% of silica. The reducing agent may be carbonaceous material such as retort carbon or coal. The ore and carbon are ground and mixed together and are preferably relatively fine. The mixing may be done in any convenient apparatus such as a mixing mill with rollers, or a ball mill. The lime or limestone for flux is preferably mixed at the same time with the charge. Thus, an example of a charge I have used is 518 lbs. of the above manganese ore, 179 lbs. of carbonaceous material and 150 lbs. of lime. This mixture was fed into the arc furnace on top of the previously added charge and on top of the slag beneath and heated there to relatively low reducing temperatures. The energy was sufficient, however, to form molten slag of the unreduced material and this slag was allowed to form until at least an inch or more in thickness before tapping. Charging of the charge was continued until the desired amount of metal had been reduced and then discontinued and the reduced metal was sampled and finished under a reducing slag after adjustment of the composition and then poured. The carbon in the charge was more than needed to reduce the oxide but the metal finished about half the usual content of blast furnace or electric furnace ferromanganese and contained about 3.5% carbon. The adjustment of composition may include addition of iron or iron ore with the charge to form the desired percentage of manganese in the reduced metal.

This process may be applied to a mixture of manganese and iron ore to produce a low carbon manganese steel direct from the ore. In this case the relative proportions of manganese oxide and iron oxide are regulated to produce the desired composition of reduced metal, such as 13% of manganese, 1% of carbon, ½% silicon and the balance iron except for minimum amounts of sulphur and phosphorus. Or this process may be applied to produce a grade of manganese-iron metal similar to spiegel iron except in carbon content, and the carbon content may be 1% or less so that this metal can be used where spiegel iron would not serve because of its high content of carbon.

I have found that by further increasing the amount of manganese oxide in the slag a still lower carbon ferromanganese can be made, and I have produced a ferromanganese with approximately 78% of manganese and 1.5% of carbon.

My process may be applied to the production of pure iron as follows:—An ore charge may be prepared of iron ore, coal and limestone, the proportion of coal being somewhat in excess of the amount needed to reduce the oxide, but the exact amount or proportion being governed by the results in operation; and the limestone being sufficient to maintain slightly basic conditions in the slag as well as to combine with the silica of the ore. The ore might contain, for example, about 70% metallic iron and a few percent of silica and practically no phosphorus or sulphur. The proportion of lime added with the ore charge will be sufficient, preferably, to maintain a slag with not over about 25% silica when thoroughly reduced and about twice that much or more lime. In this modification of my process I prefer so to control the reducing operation as to avoid complete reduction of the iron oxide in order to retain some iron oxide in the slag. The amount of carbon added will be governed by the extent of oxidation of the carbon in the furnace and as much excess carbon as possible maintained without preventing the reduction of a practically carbon free iron in the furnace. The charge might contain 100 pounds of iron ore, and 60 pounds of low grade coal, and the subsequent charges adjusted to meet the above requirements in the furnace. This charge is fed into the furnace preferably continuously and on top of the previously charged ore charge and on top of the bath at one part of the furnace. 1 prefer to use an elongated reducing and melting furnace as described in my co-pending applications of which this is a continuation in part, but do not limit myself to such a shape of furnace. The temperature is maintained so that reduction of the oxide of iron proceeds and the reduced iron collects beneath the level of the molten slag. The slag gradually collects and is maintained molten by the heat from the electric arcs. A sufficient amount of slag is maintained on top of the metal to prevent contact between carbon and reduced metal. The temperature of the incoming feed is relatively low although it may be above that at which such an ore charge would sinter in a rotary kiln and stick to the brick. As the charge reduces the slag materials are gradually melted under the effect of the electric heat and the slag blanket maintained preferably an inch or more in thickness up to several inches. The reduced iron sinks beneath this slag and the temperature of the slag is not maintained high enough to keep this reduced iron from solidifying beneath the slag. It thus collects there in very pure condition. The slag collects meanwhile and may be tapped at intervals, leaving still ample covering for the metal.

When sufficient pure iron has thus collected, I may discontinue the reducing and feed or ore charge, and may finish the batch of metal by covering it with a reducing lime-silica slag and subjecting this to electric heat and reducing action, and may then either pour the pure low carbon iron or alloy it and then pour it.

This same process just described may be applied to the treatment of low grade iron ore such as high phosphorus iron ore and the phosphorus be separated almost entirely and a very pure iron produced.

I may apply a process similar to the process above described for the treatment of pure iron ore to produce pure iron, and may apply this process to produce a pure chromium metal or a chromium-iron alloy. This chromium metal may be allowed to solidify after reduction and then when a sufficient amount has collected it may be treated to finish it by discontinuing the feed and reduction steps and adjusting the composition under a finishing reducing slag which keeps the carbon from contact with the metal. I may modify this procedure by feeding a mixture of iron ore and chrome ore, both suitably free from phosphorus and sulphur so that removal of these elements from the reduced metal is unnecessary. The carbon in this metal may be regulated as described above and a very low carbon metal may thus be produced. I prefer to carry out these processes in basic hearth furnaces so that a relatively basic slag may be maintained during reduction. This process may be carried out in an acid hearth however.

My process is also applicable to the reduction of chromium or chromium-iron metal low in carbon and subsequent completion of a batch of metal by melting into the charge in the reducing chamber or pouring into it a suitable amount of pure iron to give the desired composition of chromium iron metal, such for example as a 15% chromium iron metal with less than .10% of carbon.

Referring to the drawing and particularly to Figs. 1 and 2, I have illustrated in these figures the different parts of apparatus suitable for carrying out my process in one modification, namely for the production of pure metal directly from the ore and in Fig. 2 I have shown the finishing stage of operation in the modification where I stop the continuous reduction and finish the reduced metal in a batch.

The apparatus shown in these two figures includes a main reducing and melting chamber 1 consisting of a metal shell lined with refractory material, the refractory being selected with a view to the nature of the slag to be maintained, whether basic or acid or neutral. A rotary furnace 2 serves for preheating the mixed ore and carbonaceous charge and flux or slag forming material which may be fed into the rotary in any well known manner. The end of the rotary enters a feed head 3 which is provided with an opening into the smelting chamber below and also an exhaust stack above and a sliding or other closing means is provided at 9 for closing the opening into the smelting chamber. This door 9 is open in Fig. 1 so that the charge from the rotary drops through into the smelting chamber beneath, but in Fig. 2 when the feed from the rotary is stopped this door 9 may be moved to close the opening into the smelting chamber so as to keep the latter closed when it is desired to operate it under strongly reducing conditions such as may be desired for the finishing of the batch of metal reduced therein.

The smelting furnace is provided with electrodes shown at 4, 5, 6 and 7. Any one or more of these may be operated alone or any two together, or all of them together. In case of using one only I provide an electrical connection to the metal in the hearth of the furnace, indicated diagrammatically by the dotted lines 16 showing a bottom contact. The voltage applied between the electrodes and the bath may be regulated and controlled, high or low as desired.

The electrodes shown as four in number are arranged in this particular furnace so that the three electrodes 5, 6 and 7 may be used together for three phase operation, for heating the slag near the tapping end. A tap hole door and tap hole are indicated at 17. The three electrodes 5, 6 and 7 are shown as spaced apart at approximately equal distances,—that is the distance from 5 to 6 is about equal to the distance from 6 to 7. If using all the furnace for melting electrically, as in finishing a batch, the electrodes 4, 5 and 7 may then be used and the spacing from 4 to 5 is approximately equal to the distance from 5 to 7. Electrode 4 is shown as above the charge so as not to carry current in Fig. 1. In Fig. 2 the electrodes 4, 5 and 7 are shown arcing to the bath.

The furnace is provided with end doors 10 and 18, and other doors may be provided. Openings are shown at 8 which may be used for entrance of air or charge. In Fig. 1 the charge is shown piling up from the rotary kiln at the charge end of the smelting chamber.

In the operation in which it is desired to reduce the oxide at relatively low temperatures first, the temperatures in the pile of charge at the charge end under the rotary may be kept relatively low. Heat may be provided partly from combustion of gases formed within this smelting chamber, air being admitted in controlled amount for this purpose. The heat is more intense under the electrodes 6 and 7. As the charge piles up under the rotary it is subjected to increasing temperature so as to reduce. The low temperature zone is in the pile 11. As reduction proceeds and the temperature increases in the charge as it moves toward the slag tap end the remaining unreduced charge gradually melts and forms slag. That is it enters a higher temperature zone. These steps are described with reference to Fig. 1. Openings with suitable closing means, not shown, are provided at 19 and 20 for admission of carbonaceous and other material on the slag near the electrodes. Thus, if insufficient carbon is in the original charge to remain on top of the slag after passage of the mixed charge through the reduction zones of the smelting furnace, under the conditions of combustion maintained, then additional carbonaceous material may be charged through these openings on the slag for action on it at this part of the smelting chamber. In this modification of my process in which it is desired to reduce at low temperature and also to collect the reduced metal at temperatures approximating its melting point or below that point, the operation may proceed as indicated in this Fig. 1. That is, a layer of slag containing some unreduced oxide of the metal desired is maintained, indicated at 12. Next beneath this there is a strata of fused or semi-fused reduced metal which has collected beneath the slag. Below the semi-fused metal, indicated at 13, is a batch of pasty or solid metal which has already collected, but whose temperature is insufficient to maintain it molten, and it gradually collects beneath the melted material above it. This solid metal is marked 14. The operation of reduction is continuous in the process so far described. That is, the incoming charge heats in the pile 11, reduces, moves along toward the electrodes 5, 6 and 7, where it is subjected to increasing temperatures in any suitable way, electrically or with aid of combustion, and meantime a certain amount of unreduced oxide is retained in the slag. Then the slag, after it has been sufficiently reduced is tapped, either through the door 10 or through the slag door 17 or through the slag tap hole therein. Thus the metal is gradually taken out of the oxide which passes through the chamber and this reduced metal collects beneath the molten slag bath. Since the temperature, not only at the charge end, but clear through the smelting chamber is relatively low in that it will not maintain the pure, low carbon reduced metal molten to any great depth below the surface strata, the reduced metal which collects below the slag becomes semi-solid and solid there and the body of this metal gradually increases as the reduction of the oxide passing through the chamber adds its portion of reduced metal to the batch beneath. The reduced metal particles or globules in passing down through the oxide slag react with the slag and give up any carbon they may have previously taken on in the upper part of the charge above the slag. This process is more fully described in co-pending applications of mine. However, it is understood, that the operations of reduction may be regulated so that oxide is always present in the charge and low carbon metal reduced to start with or so that some carbonization may take place with resultant formation of carbonized metal above the slag and subsequent decarbonization in passage through the slag into the metal beneath.

After a sufficient amount of reduced metal has been collected in the smelting chamber beneath the slag, the continuous ore feed may be stopped and the reduced metal finished as illustrated in Fig. 2. The door 9 may then be closed and the ore pile allowed to completely reduce and melt into molten material so that the appearance of the chamber would then be as shown in Fig. 2 with the slag 15 extending full length of the chamber. The reduced metal is still shown as part melted, namely the upper strata 13 next to the slag, and part solid or pasty, indicated at 14. The oxide slag may then be poured off through the tap hole and replaced by fresh slag mixture. Thus the reduced metal may be kept in its freshly reduced condition, a condition which appears very important, to avoid contamination with oxide. Contrary to what might be expected, I have found this reduced metal very free from the apparent effects of oxidation, and I attribute this fact to the nature of the low temperature reduction steps and to the fact that the reduced metal subsequently collects in a low temperature and solid condition beneath the slag. After covering the reduced metal with slag forming material, such as lime and silica in suitable proportions to form a fluid slag and to not corrode the hearth lining any more than can be helped, I then start to heat up the slag and also to melt the metal and superheat it beneath the slag, meantime maintaining strongly reducing conditions by means of adding solid carbonaceous or other reducing agents on top of the slag and heating with the arcs. When the reduced metal is melted and raised to a suitable tapping temperature I am ready to pour it out of the furnace. The operation may then be repeated, and either a small amount of metal left in or metal may be melted to form a bath or reduced from fresh ore charge.

The furnace is preferably a tilting furnace but not necessarily, and a stationary type furnace may be used.

My process is an improvement over previous processes in many ways. I am able to continuously reduce into a molten bath an element such as chromium or manganese and to subsequently adjust the composition to produce directly the desired low carbon iron alloy. I find that oxidation is avoided by this process and deoxidation and production of deoxidized metal is greatly simplified. I am also able to produce low carbon metal in a much simpler manner than heretofore. I am able to use fine ore and carbon and in fact this apparently is an important feature of my process.

My process may be applied in an acid lined furnace or in a neutral lined furnace and I may operate so as to continually have an excess of carbon which appears at the slag end of the chamber and under which additional deoxidation of the slag is accomplished by means of the electric arc heating.

Heretofore, in the reduction of chromium, for example, it was and is customary to maintain the chromium molten and therefore to operate with small charges; but in my process I take advantage of the easy reduction of the chromium oxide but do not melt it or do not maintain it melted until a sufficient amount has been collected.

I claim:—

1. The method of reducing oxide ore and producing a low carbon metal, said method consisting in preparing a charge of intimately mixed and fine ore, carbonaceous material and flux, the latter in such amount as to form a slag comprising acid and basic oxides other than those desired reduced, then feeding the charge into a reducing and melting chamber and heating it there to partially reduce the oxide ore, subsequently melting the slag material and maintaining in it a sufficient amount of the metal oxide to cause low carbon metal to be collected beneath, but limiting the temperature whereby the reduced metal forms a solid or semi-solid mass beneath the slag.

2. The method of reducing oxide ore and producing a relatively low carbon metal, said method consisting in preparing an intimate mixture of fine ore, carbonaceous material and flux, the carbonaceous material in proportion to incompletely reduce the oxide under the conditions maintained in the smelting chamber, and the flux comprising one or more oxides to form a slag with the unreduced charge material, charging this charge into a reducing and melting chamber and heating to cause partial reduction of the oxide, and collecting the reduced metal beneath the slag but maintaining the temperature above the slag high enough to keep the slag molten but not high enough to maintain the metal which collects molten.

3. The method of producing refined metal from an oxide ore, said method consisting in preparing an intimate mixture of the fine ore, carbonaceous material and flux, the proportion of carbon being such as will not completely reduce the metal oxide under the conditions maintained, and the flux comprising one or more oxides to form slag with the unreduced oxides of the charge, treating this charge in a reducing and melting chamber to partly reduce the oxide, collecting the reduced metal beneath the slag in semi-molten or solid condition, and subsequently finishing the reduced metal by melting it under reducing conditions by means of electric heat.

4. The method of producing chromium iron alloy metal which consists in preparing a charge containing chromium oxide, carbonaceous material and flux in proportions to reduce the greater part of the chromium oxide and form slag with the unreduced oxides of the charge, feeding this charge into a reducing and melting chamber and heating it there sufficiently to cause partial reduction of the chromium oxide, regulating the temperature so as to melt the slag materials but not sufficiently to maintain the reduced chromium material molten beneath the slag, and then finishing the melt by adjusting the composition in iron under a finishing slag under electric heat.

5. The method of treating ore to reduce a metal oxide contained therein and obtain a low-carbon metal product which comprises heating a charge comprising the ore, slag forming material and carbonaceous material in a smelting chamber to effect reduction of the metal oxide and the production of a layer of metal in contact with a layer of slag, controlling the reducing operation to retain sufficient metal oxide in the slag to produce low carbon metal beneath, and controlling the temperature within the smelting chamber to effect substantial solidification of the metal entering the metal layer during the course of the reducing operation.

6. The method of treating ore to reduce a metal oxide contained therein and obtain a low-carbon metal product which comprises heating a charge comprising the ore, slag forming material and carbonaceous material in a smelting chamber to effect reduction of the metal oxide and the production of a layer of metal in contact with a layer of slag, controlling the reducing operation to retain sufficient metal oxide in the slag to yield low carbon metal beneath, controlling the temperature within the smelting chamber to effect substantial solidification of the metal entering the metal layer during the course of the reducing operation, substituting a reducing slag for the metal oxide-bearing slag, and heating the metal under the reducing slag to effect deoxidation.

7. The method of producing pure metal which has a relatively higher melting point when pure than when carbonized, said method consisting in preparing a charge comprising metal oxide ore, reducing agent and slag forming material, proportioning the reducing agent so as to yield a low carbon metal, feeding this charge into an electrically heated reducing and melting chamber and there causing the reduction of the low carbon metal, collecting the reduced metal beneath a slag covering in a partly solidified mass of pure metal, and then discontinuing the feed of ore charge and heating the reduced metal electrically under a reducing slag to avoid oxidation.

8. The continuous process of reducing a metal oxide ore containing iron oxide, said process consisting in providing charge comprising the ore, reducing agent and necessary fluxing or slag forming material, feeding this charge at an approximately regular rate into a part of a smelting chamber on a molten bath therein, passing it continuously thru said chamber, heating it meanwhile and maintaining limited reducing conditions whereby low carbon metal is collected beneath the slag, tapping the slag at regular intervals from a part of the chamber away from the part where the charge enters and heating the slag at the tapping part of the furnace by electric heat and collecting low carbon metal beneath the slag until sufficient metal has collected to tap it.

9. The method of smelting metal oxide ore such as iron ore, manganese ore or chrome ore, said method consisting in preparing an intimate mixture of fine ore, carbonaceous reducing agent and slag forming material, feeding this into a smelting chamber at one part thereof at a uniform rate, heating the incoming charge in this part of the chamber to a sufficient temperature to reduce the oxide partially at least, meantime heating the molten slag formed at another part of the chamber where the slag is not covered with charge to more intense heat and reducing action, using electric heat and reducing agent on the slag, controlling the slag composition in regard to basic and acid oxides other than those of the metal oxide being reduced so as to aid in reduction of the metal oxide to be reduced, and continuing the feeding of charge and tapping of slag until sufficient metal has collected.

10. The method of continuously reducing oxide ore of a metal like iron, manganese or chromium, by preparing a charge of fine ore, reducing agent and slag forming material, charging this at an approximately uniform rate into one part of a smelting chamber on the molten bath therein so that it will gradually heat and reduce and move along to a farther part of the chamber, meantime controlling the proportion of reducing agent present and the oxidizing conditions so as to continuously maintain some unreduced oxide of the desired metal in the slag thru which the metal passes to collect beneath, meantime tapping the slag at the farther end of the furnace after heating it there electrically, and collecting the low carbon metal beneath the slag.

11. The method of reducing a metal oxide ore to obtain a metal like iron or an alloy thereof, said method comprising preparing an intimate mixture of the ore, carbonaceous reducing agent and slag forming material, charging this into one part of a smelting chamber on the molten bath therein, heating the incoming charge to a reducing temperature at the incoming end of the furnace but maintaining conditions such that part of the metal oxide will remain unreduced, retaining some of this metal oxide in the slag, heating the slag formed to a higher temperature electrically at the farther end of the chamber away from the charging end, continuing the feed of charge and tapping of slag at regular intervals and collecting the reduced metal beneath the slag.

12. The process of reducing oxide ore containing one or more of the metals, iron, manganese or chromium, as oxide, the process consisting in preparing a charge comprising a mixture of the ore, carbonaceous reducing agent and slag forming material in relatively fine condition, the proportion of carbonaceous material being substantially more than sufficient to reduce the oxides present, and the slag forming material being such as will form with the other slag material of the charge a suitably fluid slag at the slag tap part of the furnace; then feeding this charge at an approximately uniform rate into one part of a smelting chamber away from the slag tap end thereof, this feed being preferably preheated, and causing this entering charge to form a pile above the molten bath and to maintain this pile by continuing the feed as the material of the pile gradually moves along under the influence of heat within the chamber towards the slag tap end thereof; heating the incoming charge in the pile sufficiently to accomplish substantial reduction of the metal oxide thereof, accomplishing this heating with the aid of combustion of gas by admission of air to the chamber, controlling the admission of air to largely burn the excess carbon in the charge and to maintain some unreduced oxide of the metal or metals desired, whereby a relatively low carbon metal will collect beneath the slag; supplying heat electrically to the slag near the slag tap end of the chamber; tapping the slag at intervals, and finally tapping the metal which has been collected beneath the slag.

13. The process of reducing oxide ore containing one or more of the metals, iron, manganese or chromium, the process consisting in preparing a charge of intimately mixed ore, carbonaceous reducing agent and slag forming material, the proportion of carbonaceous material being substantially in excess of the amount necessary to completely reduce the desired metal oxides, and the slag forming material comprising oxides which together with the oxides remaining unreduced at the slag tap end of the smelting chamber will form suitably fluid slag under the temperature maintained at that part of the furnace; feeding said charge into the smelting chamber at a part away from the said slag tap end thereof and continuing the feed to maintain a pile of charge at the entering end as the charge within the pile gradually smelts and moves toward the slag tap end; heating the charge in the pile by combustion heat by admitting air into said chamber to burn carbonaceous material therein in proximity to said pile and thereby consume the excess carbonaceous material which enters with the charge; gradually superheating the charge as it nears the slag tap end and at the slag tap end superheating it by means of electric heat, continuing the operation including feeding of charge and tapping of slag until sufficient metal has collected beneath the slag and after regulation of temperature tapping the metal thus collected.

14. The method of continuously reducing oxide ore of a metal like iron, manganese or chromium and obtaining said metal or an alloy thereof, by preparing a charge of ore, reducing agent and slag forming material, charging this at an approximately uniform rate into one part of smelting chamber on the molten bath therein so that it will gradually heat and reduce and move along to a farther part of said chamber from which part the slag may subsequently be tapped, meantime controlling the proportion of reducing agent present and the oxidizing conditions so as to reduce a substantial quantity of the desired oxide while maintaining some of said oxide unreduced in the slag as the latter forms, which slag is in contact with the reduced metal which collects beneath it; meantime superheating the slag near the slag tap end of the chamber as it collects there and subjecting it to further reducing action by adding a reducing agent to the slag in that part of the chamber, and continuing the charging and the tapping of slag until sufficient reduced metal has been collected beneath the slag and finally tapping it.

ALBERT E. GREENE.